United States Patent
Thomas et al.

(10) Patent No.: US 9,469,261 B1
(45) Date of Patent: Oct. 18, 2016

(54) CAN NETWORK SPOOFING

(71) Applicant: INTERMOTIVE, INC., Auburn, CA (US)

(72) Inventors: Keith S. Thomas, Auburn, CA (US); Dan C. Mower, Auburn, CA (US); Ryan B. Ebuen, Auburn, CA (US)

(73) Assignee: Intermotive, Inc., Auburn, CA (US)

( * ) Notice: Subject to any disclaimer, the term of this patent is extended or adjusted under 35 U.S.C. 154(b) by 119 days.

(21) Appl. No.: 14/213,825

(22) Filed: Mar. 14, 2014

Related U.S. Application Data

(60) Provisional application No. 61/789,394, filed on Mar. 15, 2013.

(51) Int. Cl.
*B60W 50/04* (2006.01)
*B60R 16/023* (2006.01)
*B60W 50/00* (2006.01)

(52) U.S. Cl.
CPC .......... *B60R 16/0231* (2013.01); *B60W 50/04* (2013.01); *B60W 2050/0043* (2013.01); *B60W 2050/0058* (2013.01); *B60W 2550/40* (2013.01)

(58) Field of Classification Search
None
See application file for complete search history.

(56) References Cited

U.S. PATENT DOCUMENTS

| 7,082,467 | B2 | 7/2006 | Border et al. |
| 7,274,980 | B1 * | 9/2007 | Schafer ................. B60P 1/4471 701/36 |
| 2010/0052882 | A1 | 3/2010 | Sverrisson et al. |
| 2013/0135118 | A1 * | 5/2013 | Ricci ......................... G06F 9/54 340/932.2 |
| 2013/0190963 | A1 * | 7/2013 | Kuss ...................... B66F 9/063 701/23 |

OTHER PUBLICATIONS

Jeff Hartman, "How to Tune and Modify Engine Management Systems," pp. 252-253, 2013 Motorbooks, Minneapolis, MN 55401 US.

* cited by examiner

*Primary Examiner* — Justin Holmes
(74) *Attorney, Agent, or Firm* — Charles L. Thoerning

(57) ABSTRACT

A system which allows an aftermarket ECM to control/alter vehicle behavior by only sending special network messages when no provision for doing so was originally designed into the original equipment manufactured system.

18 Claims, 5 Drawing Sheets

| Module Name | Network Type |
|---|---|
| Accessory Protocol Interface Module (APIM) (if equipped) | HS-CAN |
| | MS-CAN |
| ABS module | HS-CAN |
| Audio Front Control Module (ACM) | MS-CAN |
| Auxiliary Heater Control Module (AHCM) (if equipped) | HS-CAN |
| Body Control Module (BCM) (gateway module) | HS-CAN |
| | MS-CAN |
| Circuit Deactivation Ignition Module (CDIM) (if equipped) | MS-CAN |
| Dual Climate Controlled Seat Module (DCSM) (if equipped) | MS-CAN |
| Driver Seat Module (DSM) (if equipped) | MS-CAN |
| Engine Off Natural Vacuum (EONV) (if equipped) | HS-CAN |
| Global Positioning System Module (GPSM) (if equipped) | MS-CAN |
| Heated Steering Wheel Module (HSWM) (if equipped) | MS-CAN |
| HVAC module | MS-CAN |
| Instrument Panel Cluster (IPC) | HS-CAN |
| Parking Aid Module (PAM) (if equipped) | HS-CAN |
| PCM | HS-CAN |
| Restraints Control Module (RCM) | HS-CAN |
| Steering Column Control Module (SCCM) | HS-CAN |
| Trailer Brake Control (TBC) module (if equipped) | HS-CAN |
| Transfer Case Control Module (TCCM) (if equipped) | HS-CAN |
| Transmission Control Module (TCM) (if equipped) | HS-CAN |
| Tire Pressure Monitor Module (TPM) | MS-CAN |

*FIG. 1B*

```
; Message Number
;  |      Time Offset (ms)
;  |       |  Type
;  |       |   |     ID (hex)
;  |       |   |      |  Data Length Code
;  |       |   |      |   |  Data Bytes (hex) ...
;  |       |   |      |   |   |
;---+-- ----+---- --+-- ----+--- + -+ -- -- -- -- -- --
     1)   0.2  Rx    0430  8  00 01 00 00 96 97 09 D0
     2)   0.4  Rx    0433  8  D1 F4 60 00 20 00 00 08
     3)   0.7  Rx    0150  8  FF E0 2B 39 F8 5B 00 00
     4)   1.0  Rx    0151  8  10 10 00 00 00 00 00 00
     5)   1.2  Rx    0152  8  00 00 1C 75 00 00 00 00
     6)   1.5  Rx    0160  8  00 00 00 00 00 00 00 00
     7)   1.7  Rx    0084  8  7D 1E FF FE 97 F0 7D 0F
     8)   2.0  Rx    0230  8  00 60 00 4F 00 13 88 00     message ID 0230 contains transmission information
     9)   2.2  Rx    0232  8  00 00 00 00 00 00 10 00
    10)   2.5  Rx    0428  8  00 00 00 00 00 00 00 00
    11)   2.9  Rx    0091  8  00 00 7F 3F 7E BE 00 00
    12)   3.2  Rx    0092  8  6F 9C 6F 86 73 4A 00 00
    13)   3.9  Rx    0153  8  00 00 00 30 67 6C 2D A0
    14)   4.1  Rx    0154  8  00 07 6C 00 00 00 4F 2C
    15)   4.4  Rx    0200  8  72 0F 7E AD 7E AD 00 00
    16)   4.6  Rx    0420  8  00 01 04 00 00 00 2A FF
    17)   8.7  Rx    0160  8  00 00 00 00 00 00 00 00
    18)   9.0  Rx    0155  8  00 39 00 00 00 00 00 00
    19)   9.2  Rx    0041  8  00 00 00 00 00 00 00 00
    20)   9.5  Rx    0162  8  FF E0 FE 10 00 00 00 00
```

FIG. 2

```
; Message Number
;  |    Time Offset (ms)
;  |      |    Type
;  |      |     |    ID (hex)
;  |      |     |     |   Data Length Code
;  |      |     |     |    |  Data Bytes (hex) ...
;  |      |     |     |    |   |
;---+--  ----+----  --+--- ----+---  +  -+-- -- -- -- -- --
    1)    0.2  Rx    0430  8  00 01 00 00 96 97 09 D0
    2)    0.4  Rx    0433  8  D1 F4 60 00 20 00 00 08
    3)    0.7  Rx    0150  8  FF E0 2B 39 F8 5B 00 00
    4)    1.0  Rx    0151  8  10 10 00 00 00 00 00 00
    5)    1.2  Rx    0152  8  00 00 1C 75 00 00 00 00
    6)    1.5  Rx    0160  8  00 00 00 00 00 00 00 00
    7)    1.7  Rx    0084  8  7D 1E FF FE 97 F0 7D 0F
    8)    2.0  Rx    0230  8  00 60 00 4F 00 13 88 00    message ID 0230 contains transmission information
    9)    2.2  Rx    0232  8  00 00 00 00 00 00 10 00
   10)    2.5  Rx    0428  8  00 00 00 00 00 00 00 00
   11)    2.9  Rx    0091  8  00 00 7F 3F 7E BE 00 00
   12)    3.2  Rx    0092  8  6F 9C 6F 86 73 4A 00 00
   13)    3.9  Rx    0153  8  00 00 00 30 67 6C 2D A0
   14)    4.1  Rx    0154  8  00 07 6C 00 00 00 4F 2C
   15)    4.4  Rx    0200  8  72 0F 7E AD 7E AD 00 00
   16)    4.6  Rx    0420  8  00 01 04 00 00 00 2A FF
   17)    8.7  Rx    0160  8  00 00 00 00 00 00 00 00
   18)    9.0  Rx    0155  8  00 39 00 00 00 00 00 00
   19)    9.2  Rx    0041  8  00 00 00 00 00 00 00 00
   20)    9.5  Rx    0162  8  FF E0 FE 10 00 00 00 00
```

*FIG. 3*

```
     Message Number
;    |   Time Offset (ms)
;    |   |      Type
;    |   |      |     ID (hex)
;    |   |      |     |    Data Length Code
;    |   |      |     |    |  Data Bytes (hex) ...
;    |   |      |     |    |  |
;----+---------+------+----+--+-------------
     1)   0.0  Rx     0216 8  00 00 00 00 AA CC 00 00
     2)   0.3  Rx     0091 8  00 00 7F 3F 7E C9 00 00
     3)   0.5  Rx     0092 8  6F 99 6F 7E 73 55 00 00
     4)   1.6  Rx     0150 8  FF E0 2B 39 F8 5B 00 00
     5)   1.9  Rx     0151 8  10 10 00 00 00 00 00 00
     6)   2.1  Rx     0152 8  00 00 1C 75 00 00 00 00
     7)   2.4  Rx     0160 8  00 00 00 00 00 00 00 00
     8)   2.6  Rx     0230 8  00 60 00 4F 00 13 88 00    OEM transmission message. byte 2 TR=Park (00)
     9)   2.8  Rx     0232 8  00 00 00 00 00 00 10 00
     10)  3.1  Rx     0230 8  00 60 10 4F 00 13 88 00    Spoofed transmission message. byte 2 TR=Reverse
(10)
     11)  3.8  Rx     040C 8  00 00 00 00 00 00 00 00
     12)  4.0  Rx     0153 8  00 00 00 38 C1 90 83 00
     13)  4.3  Rx     0154 8  00 07 6C 00 00 00 4F 2C
     14)  4.6  Rx     0200 8  72 0F 7E AD 7E AD 00 00
     15)  4.8  Rx     0417 8  00 00 00 00 00 00 00 00
     16)  6.6  Rx     0084 8  7D 3C FF FE 79 F0 7D 1E
     17)  8.9  Rx     0155 8  00 39 00 00 00 00 00 00
     18)  9.1  Rx     0165 8  00 00 00 40 00 00 00 02
     19)  9.3  Rx     0201 8  00 03 00 00 00 00 18 00
     20)  9.6  Rx     0160 8  00 00 00 00 00 00 00 00
```

*FIG. 4*

CAN NETWORK SPOOFING

CROSS-REFERENCES TO RELATED APPLICATIONS

This United States non-provisional patent application is based upon and claims the filing date of U.S. provisional patent application Ser. No. 61/789,394 filed Mar. 15, 2013.

STATEMENT REGARDING FEDERALLY SPONSORED RESEARCH OR DEVELOPMENT

None.

REFERENCE TO A MICRO-FICHE APPENDIX

None.

TECHNICAL FIELD

This invention relates to a system which will allow an aftermarket electronic control module to control/alter vehicle behavior by sending special network messages when no provision for doing so was originally designed into the original equipment manufactured system.

BACKGROUND OF THE INVENTION

Modern vehicles use several small embedded computers, generically referred to as an ECM (Electronic Control Module). These are used to control the engine, transmission, anti-lock brakes, lighting, instruments, air bags, and so on. These ECMs communicate with each other over one or more dedicated vehicle networks. The most commonly used network technology in use today is Controller Area Network (CAN) which was originally developed by the Bosch Corporation in 1986, see e.g., FIGS. 1A and 1B. In general, all of the ECMs in a vehicle have the ability to receive and transmit serial messages asynchronously on the CAN network. When an ECM wants to send a message, it will wait until no other ECM is sending (network is idle), and it will then transmit its message.

All messages include an Identification field (ID). If two or more ECMs attempt to transmit over the common network at precisely the same time, CAN provides an arbitration scheme based on the message ID. The message with the lowest number ID will "win" the arbitration and continue to be sent. The other higher ID message(s) will be aborted early in the message transmission, as its ECM stops transmitting. The ECM of an aborted message will try to send the aborted message again after a delay. When a CAN network is designed, each ECM is assigned dedicated IDs which are not to be duplicated or used by other ECMs. This enforced ID assignment enables the arbitration scheme to work properly.

The processor/microcontrollers in the ECMs execute computer programs with fixed, dedicated algorithms/functions, so they always respond the same to the same inputs and messages. These fixed programs only respond to messages which are known or defined at the time of system design. Unknown message IDs will not be responded to. Thus it is impossible for an aftermarket ECM to be added to the network and interact with the OEM ECMs if using unknown and unexpected message IDs.

Previous solutions to alter vehicle functionality involved cutting wires and opening circuits to prevent OEM circuits from operating as designed.

While adding an aftermarket ECM to alter vehicle behavior by interacting with OEM ECMS is very desirable, doing so has not been possible prior to the system and methods disclosed in this application. Accordingly, there is a need for addressing problems associated with adding an aftermarket ECM to the CAN network.

There is likewise a need to reduce installation time for any systems addressing these issues by eliminating any need to cut and solder wires, and to further reduce system cost by eliminating harnessing and connectors.

There is a corresponding need for a more reliable end result by eliminating problems associated with OEM systems no longer being able sense their connection to their hardware solenoids, etc.

Likewise, there is a similar need for using CAN network messaging only to spoof or mimic a fault condition and to trick an associated electronic module for a desired condition.

Further it would be useful if multiple features can be incorporated into one module, thus reducing even further required harnesses, and related installation issues and expense.

DISCLOSURE OF INVENTION

The CAN network spoofing consists of using a "spoofing" message, sent by an aftermarket ECM, which indicates some condition of the vehicle is different than it actually is. This enables control of certain vehicle devices or systems by the aftermarket ECM. The spoofing message contains a message ID indicating it is from one of the OEM ECMs, thus it redirects the receiving module into performing some function differently than it would have normally. For example, on an embodiment of CAN network spoofing applied to a wheel chair lift interlock, the aftermarket ECM sends a CAN message intended for the Body Control Module (BCM), and using a message ID which will cause the BCM to interpret the message as though it were from a module reporting Transmission Range status. The BCM will respond by locking/keeping locked the transmission shifter.

The structure of the receiving ECM's software, its timing, along with the typical response time of the hardware mechanisms/devices it is controlling will generally cause the system to appear not to respond to the original/legitimate message, but rather it responds to the spoofed message instead. This is because the spoofed message is "echoed" and sent very quickly after the original message with the new desired information. The net result being that while the original message appears to be ignored, while the spoofed/echoed message is acted upon.

Spoofing works best when the message is echoed by the aftermarket ECM. The aftermarket ECM sends its spoof message immediately after seeing the normal or periodic message from the OEM ECM which is being mimicked. If the receiving ECM sees the two messages back to back, it will, in most cases ignore the first message and act on the second message, or possibly acting on the first message for such a short period of time that it appears nothing happens, or the hardware mechanism does not have sufficient time to react, but the second message's affect is lasting and brings about the desired result.

BRIEF DESCRIPTION OF DRAWINGS

FIG. 1B provides an acronym reference key chart for the CAN network schematic of FIG. 1A.

FIG. 2 depicts a sample listing of a portion of automotive vehicle CAN network traffic consisting of many broadcast messages from many ECMs.

FIG. 3 depicts partial anatomy of the CAN network traffic of FIG. 2, wherein Message Number 8 (ID 0230) is a standard OEM transmission status message with data displayed in hexadecimal format and the 00 value for the byte number 2 indicates a transmission range of PARK.

FIG. 4 depicts an applied spoofing example of the CAN network traffic of FIG. 2, wherein OEM Transmission Range Message Number 8 (ID 0230) indicating a transmission range of PARK is followed quickly (within ~500 microseconds) by spoofing Message Number 10 and the 10 value for the byte number 2 indicating a transmission range of REVERSE.

MODES FOR CARRYING OUT THE INVENTION

Figure 1A:
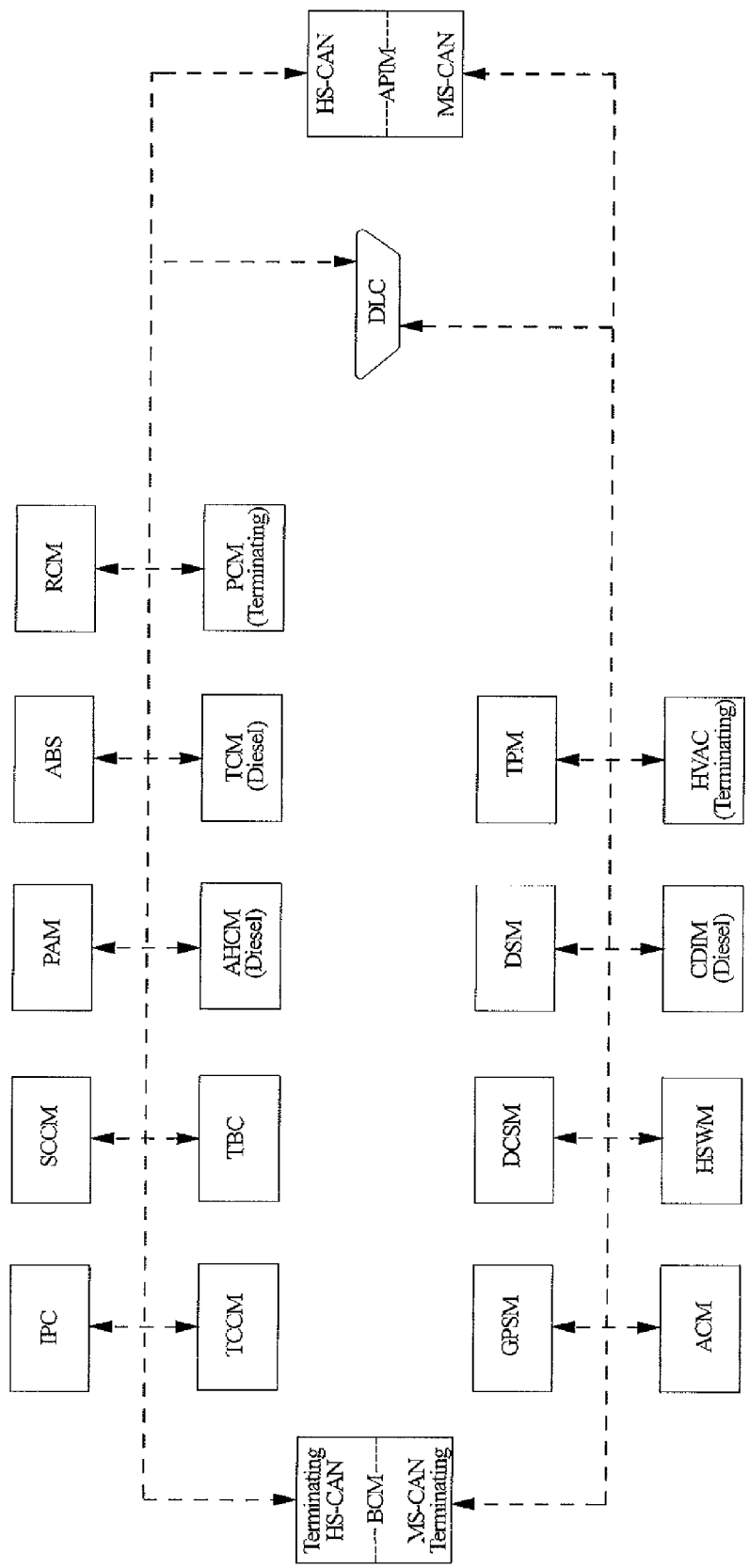
FIG. 1A depicts a typical automotive vehicle CAN network schematic, specifically for the current Ford® Motor Company SuperDuty™ truck fleet.

Spoofing consists of sending a CAN message with the same ID as another ECM's message, but with contradicting information contained in the message, see e.g., FIGS. 2-4. Although this method of vehicle control is outside of the original CAN protocol, in the unlikely event two different messages with the same ID are sent at precisely the same time, the resulting Cyclic Redundancy Check field in the resulting collided message will be corrupted and thus erroneous, resulting in all receiving ECMs to reject the message and not send an ACK. The transmitting ECMs will send their messages, due to no ACK bit being set. Thus network integrity will be maintained. To even further reduce potential message collision and arbitration issues, a preferred method is to echo the altered CAN message by sending the spoof message immediately after the original message is seen on the network, FIG. 4. The CAN network spoofing uses CAN network microprocessor(s), memory of the CAN network, any processor configured by the memory to receive control broadcast messages directed to at least one receiving module, and associated wiring among and between CAN network components.

CAN network spoofing consists of using of a "spoofing" message, sent by an aftermarket ECM, which indicates some condition of the vehicle is different than it actually is. This enables control of certain vehicle devices or systems by the aftermarket ECM. The spoofing message contains a message ID indicating it is from one of the original equipment manufacturer (OEM) ECMs, thus it redirects the receiving module into performing some function differently than it would have normally. In the example above, the aftermarket ECM sends a CAN message intended for the BCM, and using a message ID which will cause the BCM to interpret the message as though it were from a module reporting Transmission Range status. Thus the BCM will respond by not unlocking the transmission shifter when the Service Brake is pushed.

The structure of the receiving ECM's software, it's timing, along with the typical response time of the hardware mechanisms/devices it is controlling will generally cause the system to appear not to respond to the original/legitimate message, but rather it responds to the spoofed message instead. This is because the spoofed message is "echoed" and sent very quickly after the original message with the new desired information. The net result being that while the original message appears to be ignored, while the spoofed/echoed message is acted upon.

Spoofing works best when the message is echoed by the aftermarket ECM. It sends its spoof message immediately after seeing the normal or periodic message from the OEM ECM which is being mimicked. If the receiving ECM sees the two messages back to back, it will, in most cases ignore the first message and act on the second message, or possibly acting on the first message for such a short period of time that it appears nothing happens, or the hardware mechanism does not have sufficient time to react, but the second message's affect is lasting and brings about the desired result.

Since CAN messaging arbitration relies on no two modules being allowed to use the same message ID, and this spoofing scheme violates that principle, there is the possibility of destructive message collisions if both modules attempted to transmit at the same time. It is best if the aftermarket module only transmits right after seeing a message from the mimicked module, thus minimizing the potential for collisions. Note that if a collision does occur, the message's Cyclic Redundancy Check value will likely be corrupted, causing all ECM's to reject the corrupted message.

According to an embodiment of a CAN network spoofing system to allow an aftermarket electronic control module to alter or control an automotive vehicle response only by special controller area network messages, the system provides: a) at least one microprocessor based memory; and b) at least one processor configured by the memory to perform the steps of: (i) receiving a first electronic control broadcast message directed to at least one receiving module; and (ii) causing a subsequent electronic control broadcast message to alter a specific data characteristic in such manner as to spoof or mimic a condition that will cause the at least one receiving module to perform some function differently than it would have under the first electronic control broadcast.

According to an embodiment of a CAN network spoofing, a device to allow an aftermarket electronic control module to alter or control an automotive vehicle response only by special controller area network messages, includes: a) at least one microprocessor based memory; and b) at least one processor configured by the memory to perform the steps of: (i) receiving a first electronic control broadcast message directed to at least one receiving module; and (ii) causing a subsequent electronic control broadcast message to alter a specific data characteristic in such manner as to spoof or mimic a condition that will cause the at least one receiving module to perform some function differently than it would have under the first electronic control broadcast.

According to an embodiment of a CAN network spoofing computer-readable medium having stored thereon computer-executable instructions for configuring a processor to allow an aftermarket electronic control module to alter or control an automotive vehicle response only by special controller area network messages by performing the steps of: a) receiving a first electronic control broadcast message directed to at least one receiving module; and b) causing a subsequent electronic control broadcast message to alter a specific data characteristic in such manner as to spoof or mimic a condition that will cause the at least one receiving module to perform some function differently than it would have under the first electronic control broadcast.

Example of an Embodiment of CAN Network Spoofing Relating to a Wheel Chair Lift Interlock Federal Motor Vehicle Safety Standards (FMVSS) 403 and 404 require the installation of a safety interlock system which will prevent a vehicle from being driven when a wheel chair lift is installed and in use on a public use vehicle, and those sold to the public with the lift already installed. The most commonly used method to achieve this is by A) ensuring the vehicle's transmission is in Park before allowing the lift to be operated, and B) by locking the transmission shifter in Park to prevent it from being moved into a drive gear while the lift is in use. Ensuring the Park Brake is set before the lift is enabled provides an added level of safety.

The automotive manufacturers do not provide a way to easily force a locked down state when the lift is in operation. U.S. motor vehicles under 14,500 pounds gross vehicle weight rating (GVWR) are required however to provide a Brake Transmission Shift Interlock (BTSI), such that the Service Brake must be pressed before the transmission shifter can be moved out of the Park position. All public use vehicles under 14,500 GVWR today have this interlock. Making use of this existing OEM shift lock mechanism to provide the required lift interlock function is a desirable approach, since the electro-mechanical interlock is already provided. Taking control of this existing interlock is usually done by tapping into the OEM wiring and providing an electrical signal which will directly activate/deactivate the electrical solenoid of the BTSI. There are some disadvantages to this "hard wired" approach however. A special harness is required and some vehicle disassembly is required to install the harness. Also, as modern vehicle electronics become more and more sophisticated, they often sense that their load (the BTSI solenoid) has been disconnected. Modifying the OEM BTSI harness can set Diagnostic Trouble Codes, or worse, can cause the OEM system to lock up and stop working as it senses a problem.

A better approach is to redirect the OEM system into thinking the Transmission is not in Park, and thus it does not need to release the BTSI solenoid when the Service Brake is pushed. In this way, the OEM system will keep the transmission locked in Park during wheel chair lift operations. When this is done correctly, it eliminates the need for vehicle disassembly, special shift lock harnessing/connectors, and the added cost of these. Redirecting the OEM electronics so it does not release the shift lock mechanism when Service Brake has been pushed can be done over the vehicles OBDII CAN network by "spoofing" and "echoing" the normal Transmission Range message.

Sending contradicting information in the message causes the receiving/responding ECM to alter its behavior to perform what is desired by the aftermarket sending ECM. In the above example of an embodiment of CAN network spoofing applied to a wheel chair lift interlock, if the Service Brake is pressed when the transmission is in Park, the ECM controlling the Shift Lock mechanism (frequently called the BCM or Body Control Module) will release the shifter, allowing the transmission to be shifted out of Park. If a spoofing message is sent by an aftermarket ECM, indicating the transmission is in some other gear, the BCM will not release the shifter. In this way, the vehicle can be locked down, and prevented from being driven when the wheel chair lift is in use.

This allows an aftermarket ECM to implement the required wheel chair lift interlock function by spoofing/echoing a Transmission Range message. Spoofing the CAN message which contains the Transmission Range status information requires using the same message ID as the original sending ECM, because the BCM looks for this ID and will respond to the message.

Locking the shifter in this manner is significantly easier for a vehicle up-fitter than having to tap into or interrupt wires and control the shift lock solenoid electrically. It also eliminates the problem of the BCM detecting that it is no longer (even temporarily) connected to the shift lock solenoid which can set Diagnostic Trouble Codes or DTC's in the vehicle.

Another example of a spoofing message would be to send a Transmission Range equals Reverse message, while the vehicle is actually in Park. This can have the effect of turning on the reverse or back up lights on the vehicle. Thus, in accordance with the foregoing example, an embodiment of CAN network spoofing provides using network messaging only to spoof or mimic a fault condition to trick an ECM.

This approach transmits a message on the network which will be identified as having been sent by another ECM, thus the term "spoofing." While this works outside of originally conceived CAN network methodology (no two ECMs should use the same message ID), it does provide a way for an aftermarket ECM to effectively alter certain aspects of the vehicles behavior (shift lock in this example). It should be noted that there are numerous possible embodiments or uses of this spoofing technique. It is not limited to controlling a shift lock mechanism.

In addition, by "echoing" the spoofed message after each original message, the associated OEM ECMs respond as desired by the aftermarket ECM. This greatly minimizes the possibility of message conflict and subsequent CAN arbitration.

According to an embodiment of a CAN network spoofing system the receiving module is a transmission shift lock mechanism for wheel chair interlock of the body control module and the specific data characteristic is brake not-engaged.

According to an embodiment of a CAN network spoofing system the electronic control broadcast messages are in hexadecimal format.

According to an embodiment of a CAN network spoofing system the processor is further configured by the memory to perform the step of constraining operation of one or more other vehicle systems in such manner as to increase the likelihood that the at least one receiving module will override the body control module of the vehicle controller area network.

According to an embodiment of a CAN network spoofing system the constraining of operation of one or more other vehicle systems comprises disabling a braking sensor circuit so as to prevent shifting out of park.

According to an embodiment of a CAN network spoofing system the constraining of operation of one or more other vehicle systems comprises disabling a vehicle transmission shift mechanism circuit so as to prevent the vehicle from being shifted out of park.

According to an embodiment of a CAN network spoofing system the constraining of operation of one or more other vehicle systems comprises disabling an electronic control module override circuit.

According to an embodiment of a CAN network spoofing system the condition that will cause the receiving module to perform some function differently than it would have under the first electronic control broadcast is received from a location that is within the vehicle.

According to an embodiment of a CAN network spoofing system a command to lock/keep locked a vehicle transmission shifter is triggered by one or more species selected from among the group consisting of: transmission range status; activation of a wheelchair lift apparatus; parking brake status; and wheelchair lift door status.

According to an embodiment of a CAN network spoofing device, the receiving module is a transmission shift lock mechanism for wheel chair interlock of the body control module and the specific data characteristic is brake not-engaged.

According to an embodiment of a CAN network spoofing device, the electronic control broadcast messages are in hexadecimal format.

According to an embodiment of a CAN network spoofing device, the processor is further configured by the memory to perform the step of constraining operation of one or more other vehicle systems in such manner as to increase the likelihood that the at least one receiving module will override the body control module of the vehicle controller area network.

According to an embodiment of a CAN network spoofing device, the constraining of operation of one or more other vehicle systems comprises disabling a braking sensor circuit so as to prevent shifting out of park.

According to an embodiment of a CAN network spoofing device, the constraining of operation of one or more other vehicle systems comprises disabling a vehicle transmission shift mechanism circuit so as to prevent the vehicle from being shifted out of park.

According to an embodiment of a CAN network spoofing device, the constraining of operation of one or more other vehicle systems comprises disabling an electronic control module override circuit.

According to an embodiment of a CAN network spoofing device, the condition that will cause the at least one receiving module to perform some function differently than it would have under the first electronic control broadcast is received from a location that is within the vehicle.

According to an embodiment of a CAN network spoofing device, a command to lock/keep locked a vehicle transmission shifter is triggered by one or more species selected from among the group consisting of: transmission range status; activation of a wheelchair lift apparatus; parking brake status; and wheelchair lift door status.

According to an embodiment of a CAN network spoofing computer-readable medium having stored thereon computer-executable instructions for configuring a processor to allow an aftermarket electronic control module to alter or control an automotive vehicle response only by special controller area network messages, a command to lock/keep locked a vehicle transmission shifter is triggered by one or more species selected from among the group consisting of: transmission range status; activation of a wheelchair lift apparatus; parking brake status; and wheelchair lift door status.

Thus, an improved system, device and computer-readable medium for CAN network spoofing are described and disclosed. These embodiments of CAN network spoofing redirect the OEM system by network messages only into thinking a fault condition exists, and these improvements:
1) eliminate the need to make electrical connections via harnesses to a vehicle's various electrical systems;
2) eliminate the associated electrical faults which are frequently detected when modifying OEM vehicle circuits and disconnecting expected loads;
3) provide a more economical solution with less labor costs when trying to control vehicle OEM devices and systems; and
4) provide a practical solution to controlling vehicle devices where other solutions are not viable.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

We claim:

1. A system to allow an aftermarket electronic control module to alter or control an automotive vehicle response by special controller area network messages only, the system comprising:
   a) at least one microprocessor based memory; and
   b) at least one processor configured by the memory to perform the steps of:
      (i) receiving a first electronic control broadcast message directed to at least one receiving module; and
      (ii) causing a subsequent electronic control broadcast message to alter a specific data characteristic of the first electronic control broadcast message to spoof or mimic a condition that will cause the at least one receiving module to function differently than it would have under the first electronic control broadcast message.

2. A system to allow an aftermarket electronic control module to alter or control an automotive vehicle response only by special controller area network messages according to claim 1 wherein the at least one receiving module is a transmission shift lock mechanism for wheel chair interlock of a related body control module and the specific data characteristic is brake not-engaged.

3. A system to allow an aftermarket electronic control module to alter or control an automotive vehicle response only by special controller area network messages according to claim 1 wherein the processor is further configured by the memory to perform the step of constraining operation of one or more other vehicle systems to increase the likelihood that the at least one receiving module will over-ride a related body control module of the vehicle controller area network.

4. A system to allow an aftermarket electronic control module to alter or control an automotive vehicle response only by special controller area network messages according to claim 3 wherein the step of constraining operation of one or more other vehicle systems comprises disabling a braking sensor circuit so as to prevent shifting out of park.

5. A system to allow an aftermarket electronic control module to alter or control an automotive vehicle response only by special controller area network massages according to claim 3 wherein the step of constraining operation of one or more other vehicle systems comprises disabling a vehicle transmission shift mechanism circuit so as to prevent the vehicle from being shifted out of park.

6. A system to allow an aftermarket electronic control module to alter or control an automotive vehicle response only by special controller area network messages according to claim 3 wherein the step of constraining operation of one or more other vehicle systems comprises disabling an electronic control module override circuit.

7. A system to allow an aftermarket electronic control module to alter or control an automotive vehicle response only by special controller area network messages according to claim 1 wherein the condition that will cause the at least one receiving module to function differently than it would have under the first electronic control broadcast is received from a location that is within the vehicle.

8. A system to allow an aftermarket electronic control module to alter or control an automotive vehicle response only by special controller area network messages according to claim 7 wherein a command to lock/keep locked a vehicle transmission shifter is triggered by one or more species selected from among the group consisting of: transmission range status; activation of a wheelchair lift apparatus; parking brake status; and wheelchair lift door status.

9. A device to allow an aftermarket electronic control module to alter or control an automotive vehicle response only by special controller area network messages, the device comprising:
  a) at least one microprocessor based memory; and
  b) at least one processor configured by the memory to perform the steps of:
    (i) receiving a first electronic control broadcast message directed to at least one receiving module; and
    (ii) causing a subsequent electronic control broadcast message to alter a specific data characteristic of the first electronic control broadcast message to spoof or mimic a condition that will cause the at least one receiving module to function differently than it would have under the first electronic control broadcast message.

10. A device to allow an aftermarket electronic control module to alter or control an automotive vehicle response only by special controller area network messages according to claim 9 wherein the at least one receiving module is a transmission shift lock mechanism for wheel chair interlock of a related body control module and the specific data characteristic is brake not-engaged.

11. A device to allow an aftermarket electronic control module to alter or control an automotive vehicle response only by special controller area network messages according to claim 9 wherein the processor is further configured by the memory to perform the step of constraining operation of one or more other vehicle systems to increase the likelihood that the receiving module will over-ride a related body control module of the vehicle controller area network.

12. A device to allow an aftermarket electronic control module to alter or control an automotive vehicle response only by special controller area network messages according to claim 11 wherein the step of constraining operation of one or more other vehicle systems comprises disabling a braking sensor circuit so as to prevent shifting out of park.

13. A device to avow an aftermarket electronic control module to alter or control an automotive vehicle response only by special controller area network messages according to claim 11 wherein the step of constraining operation of one or more other vehicle systems comprises disabling a vehicle transmission shift mechanism circuit so as to prevent the vehicle from being shifted out of park.

14. A device to allow an aftermarket electronic control module to alter or control an automotive vehicle response only by special controller area network messages according to claim 11 wherein the step of constraining operation of one or more other vehicle systems comprises disabling an electronic control module override circuit.

15. A device to allow an aftermarket electronic control module to alter or control an automotive vehicle response only by special controller area network messages according to claim 11 wherein the condition that will cause the at least one receiving module to function differently than it would have under the first electronic control broadcast is received from a location that is within the vehicle.

16. A device to allow an aftermarket electronic control module to alter or control an automotive vehicle response only by special controller area network messages according to claim 15 wherein a command to lock/keep locked a vehicle transmission shifter is triggered by one or more species selected from among the group consisting of: transmission range status; activation of a wheelchair lift apparatus; parking brake status; and wheelchair lift door status.

17. A computer-readable medium having stored thereon computer-executable instructions for configuring a processor to allow an aftermarket electronic control module to alter or control an automotive vehicle response only by special controller area network messages by performing the steps of:
  a) receiving a first electronic control broadcast message directed to at least one receiving module; and
  b) causing a subsequent electronic control broadcast message to alter a specific data characteristic of the first electronic control broadcast message to spoof or mimic a condition that will cause the at least one receiving module to function differently than it would have under the first electronic control broadcast message.

18. A computer-readable medium having stored thereon computer-executable instructions for configuring a processor to allow an aftermarket electronic control module to alter or control an automotive vehicle response only by special non-transitory controller area network messages according to claim 17 wherein a command to lock/keep locked a vehicle transmission shifter is triggered by one or more species selected from the group consisting of: transmission range status; activation of a wheelchair lift apparatus; parking brake status; and wheelchair lift door status.

* * * * *